United States Patent
Pham (10) Patent No.: US 8,923,646 B2
(45) Date of Patent: Dec. 30, 2014

(54) GEODESIC SUPERPIXEL SEGMENTATION

(71) Applicant: Canon Kabushiki Kaisha, Tokyo (JP)

(72) Inventor: Tuan Quang Pham, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 13/717,373

(22) Filed: Dec. 17, 2012

(65) Prior Publication Data

US 2013/0156314 A1  Jun. 20, 2013

(30) Foreign Application Priority Data

Dec. 20, 2011 (AU) ............................... 2011265383

(51) Int. Cl.
  *G06K 9/40*  (2006.01)
  *G06T 7/00*  (2006.01)
  *G06K 9/00*  (2006.01)

(52) U.S. Cl.
  CPC ..... *G06T 7/0083* (2013.01); *G06T 2207/20041* (2013.01); *G06T 7/0091* (2013.01)
  USPC .......................................... 382/275; 382/273

(58) Field of Classification Search
  CPC ....... G06T 5/00; G06T 7/0051; G06T 7/0079; G06T 7/0083
  USPC ......... 382/173, 181, 199, 254, 273–275, 262; 375/240.03, 240.24
  See application file for complete search history.

(56) References Cited

U.S. PATENT DOCUMENTS

| | | | | |
|---|---|---|---|---|
| 8,452,117 B2* | 5/2013 | Adams et al. | ................ | 382/262 |
| 8,737,485 B2* | 5/2014 | Zhang et al. | ............ | 375/240.24 |
| 2006/0050959 A1 | 3/2006 | Grady et al. | | |
| 2008/0317377 A1* | 12/2008 | Saigo et al. | ................... | 382/274 |
| 2013/0121407 A1* | 5/2013 | Chono et al. | ............ | 375/240.03 |
| 2013/0156314 A1* | 6/2013 | Pham | ........................... | 382/173 |
| 2014/0153829 A1* | 6/2014 | Pham et al. | .................. | 382/173 |

OTHER PUBLICATIONS

Levinshtein et al.; "TurboPixels: Fast Superpixels Using Geometric Flows"; University of Toronto Toronto, Canada, 2012.
Zeng et al.; "Structure-sensitive Superpixels via Geodesic Distance"; Proceedings from ICCV, Barcelona, 2011; IEEE: 2011.
Achanta et al. ; "SLIC Superpixels"; School of Computer and Communication Sciences. 2008.

* cited by examiner

*Primary Examiner* — Amir Alavi
(74) *Attorney, Agent, or Firm* — Canon U.S.A., Inc. IP Division (57) ABSTRACT

An aspect of the present invention provides a method of segmenting an input image into a plurality of segments. The method comprises the steps of: deriving an image representative of boundary strength of each of a plurality of pixels in the input image; adding a random noise pattern to at least a portion of the derived image; determining a plurality of local minima in the derived image with the random noise pattern added, each of the plurality of local minima comprising a point with a lowest measure of boundary strength within a pre-defined region in the derived image; and associating each of the plurality of pixels in the input image with one of the determined local minima to segment the image based on a geodesic distance transform of the measure between the determined local minima and the pixels.

8 Claims, 9 Drawing Sheets

GEODESIC SUPERPIXEL SEGMENTATION

REFERENCE TO RELATED PATENT APPLICATION

This application claims the benefit under 35 U.S.C. §119 of the filing date of Australian Patent Application No. 2011265383, filed Dec. 20, 2011, hereby incorporated by reference in its entirety as if fully set forth herein.

TECHNICAL FIELD

The current invention relates to digital image processing and, in particular, to methods, systems and computer program products for segmenting an image into a plurality of segments.

BACKGROUND

An image is made up of visual elements, wherein a visual element is defined as a region in a sampled image. A commonly used visual element in image processing is a picture element or pixel. However, image processing on a pixel level is often slow for mega-pixel or bigger images. By grouping connected pixels that share common properties such as intensity, colour or texture into a superpixel, the image can advantageously be analysed at a higher granularity level and consequently at a faster processing speed (or, alternatively, with requiring less processing resources). Partitioning of an image into such groups of pixels is known as superpixel segmentation.

Over-segmentation of an image into regular sized and shaped superpixels that respect scene boundaries is useful for subsequent image processing tasks. Regular superpixel segmentation produces compact visual elements of similar size and shape for similar treatment of an image's local neighbourhood. Boundary-respecting superpixels are more likely to cover pixels from the same object in a scene, which further improves the localisation of subsequent image processing measures.

One approach is watershed segmentation, which over-segments an image by flooding a landscape defined by the image's gradient magnitude and building watersheds along ridges that divide different water catchment basins. More efficient methods such as graph-based segmentation can also produce edge-following segmentation, which means that edges in the image are well tracked by the segmentation boundaries. Both watershed and graph-based segmentation, however, produce irregularly sized and shaped segments.

Other techniques produce regular superpixels. One such method uses curve evolution to guide superpixel boundaries from a set of seed points on a rectangular grid towards scene boundaries. A significant disadvantage of the curve evolution method is its slow speed since the method typically requires hundreds of curve evolution iterations, especially if the superpixels are large.

Another such method uses a linear iterative clustering of local pixels in a five-dimensional (5-D) Labxy space defined by the L*-a*-b* colours from the CIE standard and the x-y pixel coordinates. Similar to the curve evolution method, the initial cluster centres of the iterative clustering method also come from a set of points on a regular grid. Both the curve evolution method and the iterative clustering method disadvantageously require multiple scans (typically more than 10) over a derived image. These methods are therefore not suitable for hardware environments in which limited on-chip memory cannot buffer the whole image and real-time performance is critical.

None of the above-mentioned segmentation methods can produce an exact desirable number of superpixels. An exact number of superpixels is useful for resource planning, for example, sending each superpixel to different parallel computing units. An exact number of superpixels is also useful for matching two or more images of similar content so that each superpixel in one image has an unique corresponding superpixel in another image.

In summary, there is a need for a segmentation method that achieves one or more desirable characteristics of good superpixel segmentation, including: edge-following, regularity, exact number of segments and practical computational requirements. In particular, there is a need for an improved method and system for rapidly segmenting an image into a desirable number of regular, edge-following superpixels.

SUMMARY

An aspect of the present invention provides a method of segmenting an input image into a plurality of segments. The method comprises the steps of: deriving an image representative of boundary strength of each of a plurality of pixels in the input image; adding a random noise pattern to at least a portion of the derived image; determining a plurality of local minima in the derived image with the random noise pattern added, each of the plurality of local minima comprising a point with a lowest measure of boundary strength within a pre-defined region in the derived image; and associating each of the plurality of pixels in the input image with one of the determined local minima to segment the image based on a geodesic distance transform of the measure between the determined local minima and the pixels.

The method may comprise the further step of adding a constant offset to the derived image, which would result in the segmentation being more regularised.

The same random noise pattern may be used across multiple frames of a video. The random noise pattern may also be warped according to motion between the video frames before being added to the derived image.

The local minima may be determined using non-maximal suppression or adaptive non-maximal suppression.

The geodesic distance transform may be computed using a chamfer algorithm or a band-based chamfer algorithm.

The derived image may comprise an image of local gradient energy of the input image, and the gradient energy of the input image may comprise a linear combination of the gradient energy of each channel of the input image.

The input image may be converted to the CIE L*-a*-b* colour space before computing the gradient energy of each channel.

Another aspect of the present invention provides a method of segmenting an input image into a plurality of segments. The method comprises the steps of: deriving an image representative of boundary strength of each of a plurality of pixels in the input image; determining a plurality of seed points in the derived image, each of the plurality of seed points comprising a point on a grid; perturbing the plurality of seed points on the grid away from strong boundary pixels in the derived image; and associating each of the plurality of pixels in the input image with one of the determined seed points to segment the image based on a geodesic distance transform of the measure between the determined seed points and the pixels.

The method may comprise the further step of adding a constant offset to the derived image, which would result in the segmentation being more regularised.

The geodesic distance transform may be computed using a chamfer algorithm or a band-based chamfer algorithm.

The derived image may comprise an image of local gradient energy of the input image and the gradient energy of the input image may comprise a linear combination of the gradient energy of each channel of the input image.

The input image may be converted to the CIE L*-a*-b* colour space before computing the gradient energy of each channel.

Another aspect of the present invention provides a computer system for segmenting an input image into a plurality of segments. The computer system comprises: a memory unit for storing data and instructions; and a processor unit coupled to the memory unit. The processor unit is programmed to: compute an image representative of boundary strength of each of a plurality of pixels in the input image; add a random noise pattern to at least a portion of the derived image; determine a plurality of local minima in the derived image with the random noise pattern added, each of the plurality of local minima comprising a point with a lowest measure of boundary strength within a pre-defined region in the derived image; and associate each of the plurality of pixels in the input image with one of the determined local minima to segment the image based on a geodesic distance transform of the measure between the determined local minima and the pixels.

The processor unit may be further programmed to add a constant offset to the derived image.

The processor unit may be further programmed to compute the geodesic distance transform using a chamfer algorithm or a band-based chamfer algorithm.

Another aspect of the present invention provides a computer system for segmenting an input image into a plurality of segments. The computer system comprises: a memory unit for storing data and instructions; and a processor unit coupled to the memory unit. The processor unit is programmed to: compute an image representative of boundary strength of each of a plurality of pixels in the input image; determine a plurality of seed points in the derived image, each of the plurality of seed points comprising a point on a grid; perturb the plurality of seed points away from strong boundary pixels in the derived image; and associate each of the plurality of pixels in the input image with one of the determined seed points to segment the image based on a geodesic distance transform of the measure between the determined seed points and the pixels.

The processor unit may be further programmed to add a constant offset to the derived image.

The processor unit may be further programmed to compute the geodesic distance transform using a chamfer algorithm or a band-based chamfer algorithm.

Further aspects of the present invention are directed to a computer readable storage medium having a program recorded thereon for performing a method described herein and an image segmentation formed by a method described herein.

BRIEF DESCRIPTION OF THE DRAWINGS

One or more embodiments of the invention are described hereinafter with reference to the following drawings, in which.

DETAILED DESCRIPTION

The present disclosure relates to fast methods of segmenting an image of a scene into regular sized and shaped segments that follow scene boundaries.

The methods described hereinafter advantageously offer one or more of: improved edge-following segmentation, more regular segments in relation to both size and shape, faster calculation speed and better integration for hardware embedding, when compared to existing methods.

The methods described hereinafter uses geodesic distance between every pixel and a seed point to produce a nearest seed transform on a geodesic space defined by a measure of boundary strength in the image. The nearest seed transform produces image segments whose boundaries often coincide with strong boundaries in the image.

In one arrangement, the well-separated and evenly distributed seed points are located at local minima of the boundary strength image, which grows to regular sized and shaped image segments.

In another arrangement, the seed points are located at perturbed grid points away from strong boundary pixels.

The fast execution speed and improved integration for hardware embedding of the methods is achieved by the advantageous use of efficient algorithms with minimal memory requirements for performing local minima detection and geodesic distance transforms.

Figure 1A:
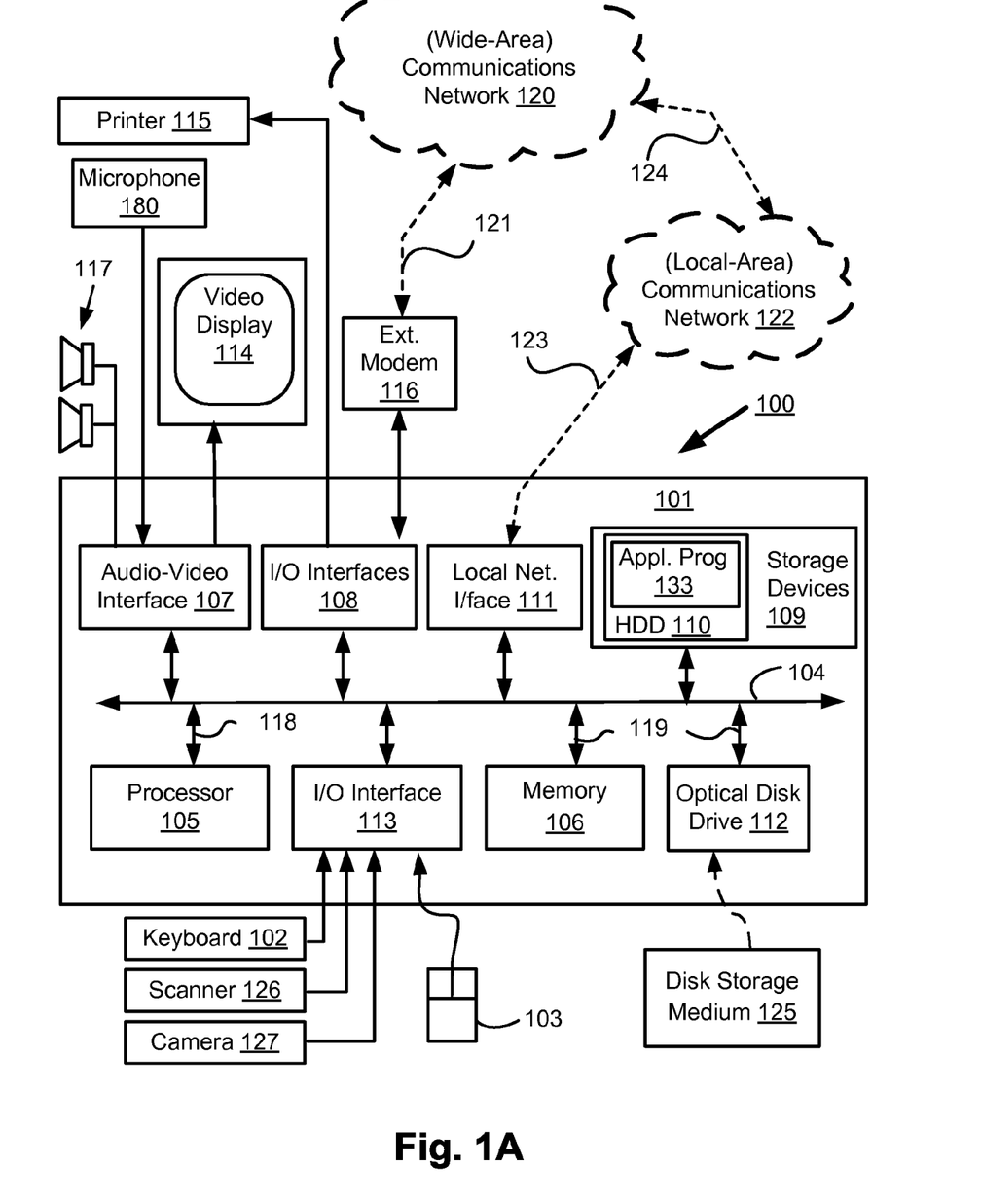
FIGS. 1A and 1B comprise a schematic block diagram of a general purpose computer system upon which arrangements and/or embodiments described herein can be practised.
Figure 1B:
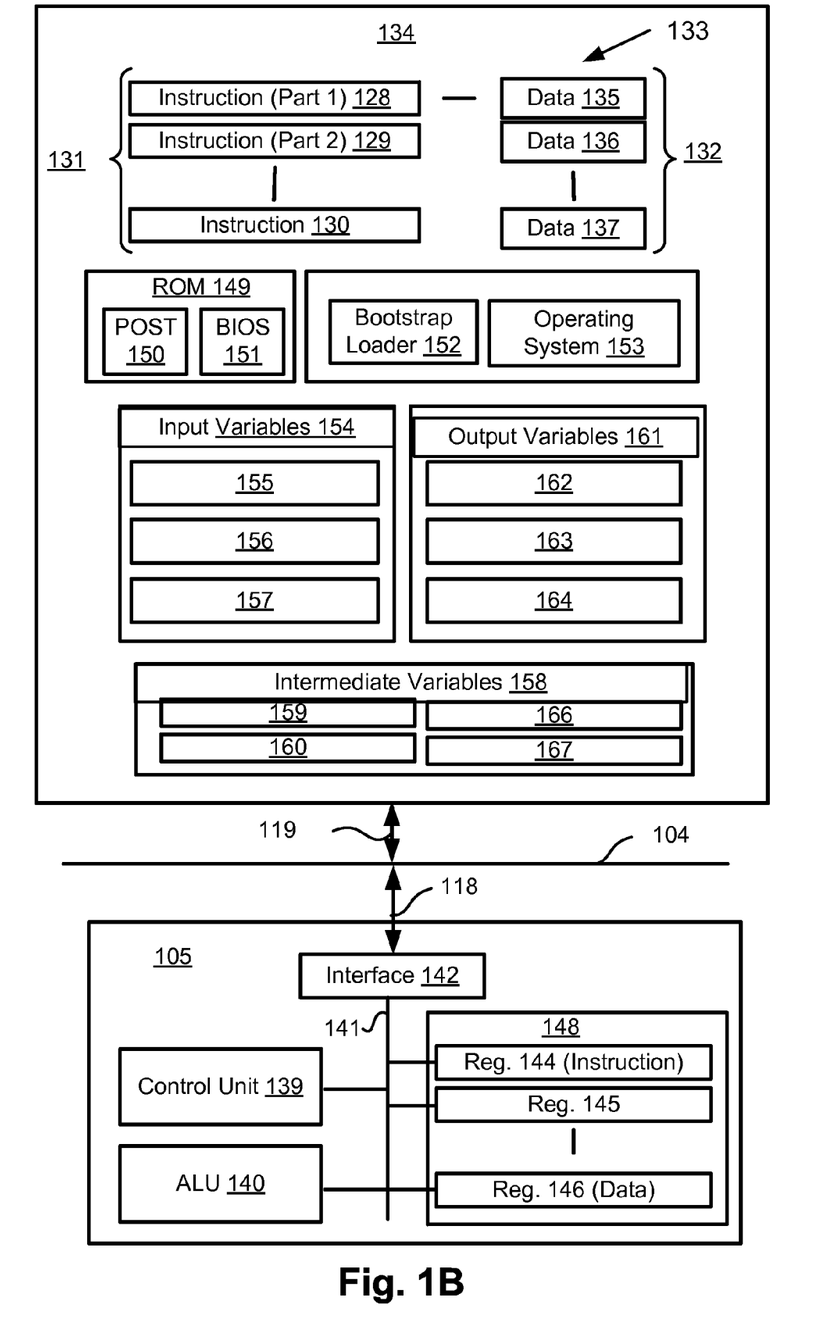

FIGS. 1A and 1B depict a general-purpose computer system 100, upon which the various arrangements described hereinafter can be practised.

As shown in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. The at least one processor unit 105 may be programmed to perform the steps of the methods described herein. The memory unit 106 may, for example, have semiconductor random access memory (RAM) and semiconductor read only memory (ROM). The computer module 101 also includes an number of input/output (I/O) interfaces including: an audio-video interface 107 that couples to the video display 114, loudspeakers 117, and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement, or an IEEE 802.11 wireless arrangement; however, numerous other types of interfaces may be practised for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PCs and compatibles, Sun Sparcstations, Apple Mac™, or alike computer systems.

The methods of segmenting an input image into a plurality of segments may be implemented using the computer system 100, wherein the processes of FIGS. 2, 3 and 4, described hereinafter, may be implemented as one or more software application programs 133 executable within the computer system 100. In particular, the steps of the method of segmenting an input image into a plurality of segments are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules perform the segmenting methods and a second part and the corresponding code modules manage a user interface between the first part and the user.

In one example, the input images on which segmentation is performed are captured by the camera 127 and passed to the computer module 101 for processing. In another example, the images on which segmentation is performed are retrieved from storage, such as the disk storage medium 125, one of the storage devices 109, or any combination thereof In a further embodiment, one or more of the images on which segmentation is performed are received by the computer module 101 by a communications link, such as one of the communications networks 120, 122.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for image processing.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for image processing, including, for example, a camera and a computing device for segmenting images.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s).Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS)module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternatively, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed image processing arrangements use input variables 154, which are stored in the memory 134 in corresponding memory locations 155, 156, 157. The image processing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 2:
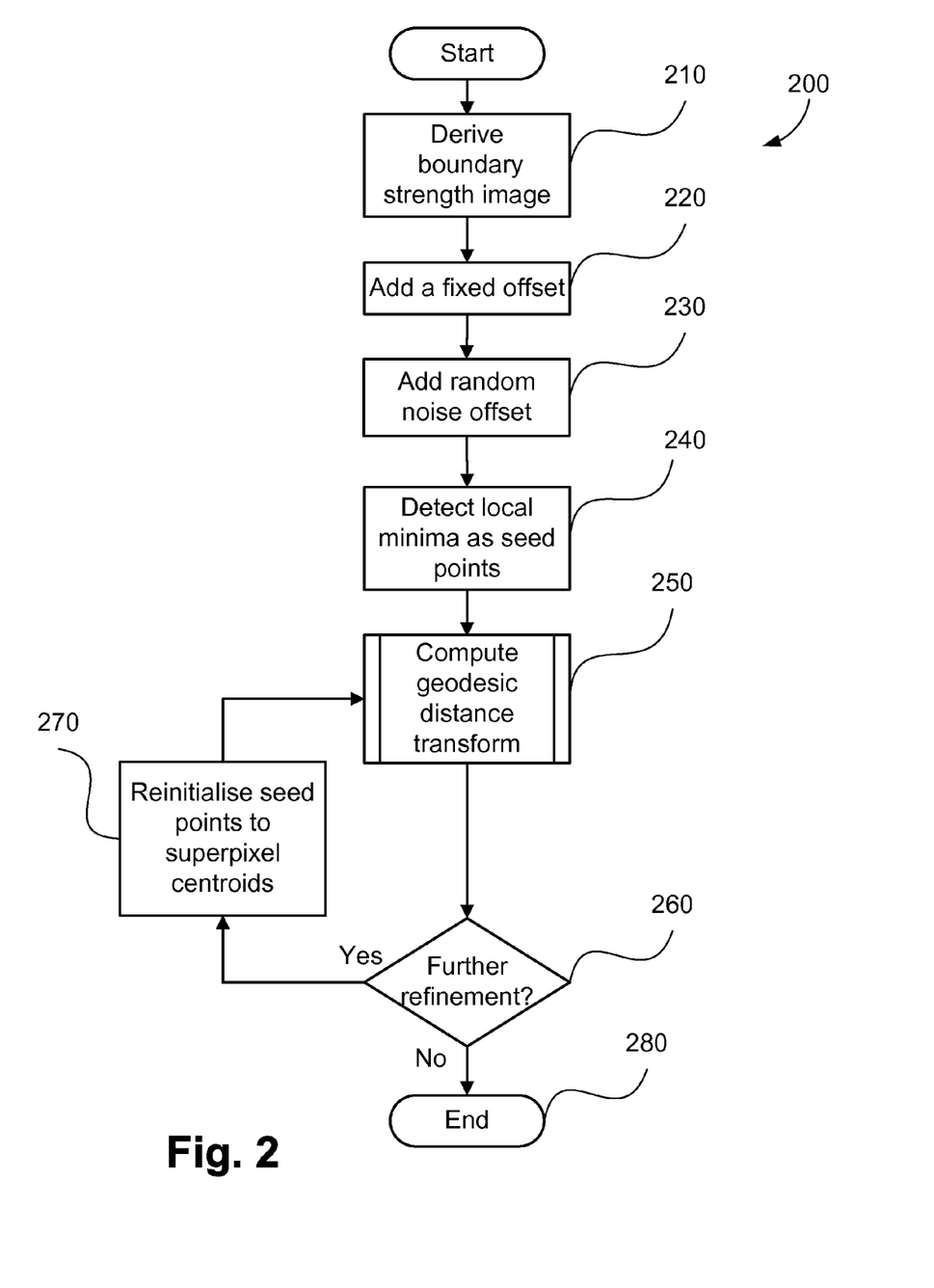
FIG. 2 is a flow diagram of a process for segmenting an image into a plurality of image segments in accordance with an embodiment of the present invention.
Figure 3:
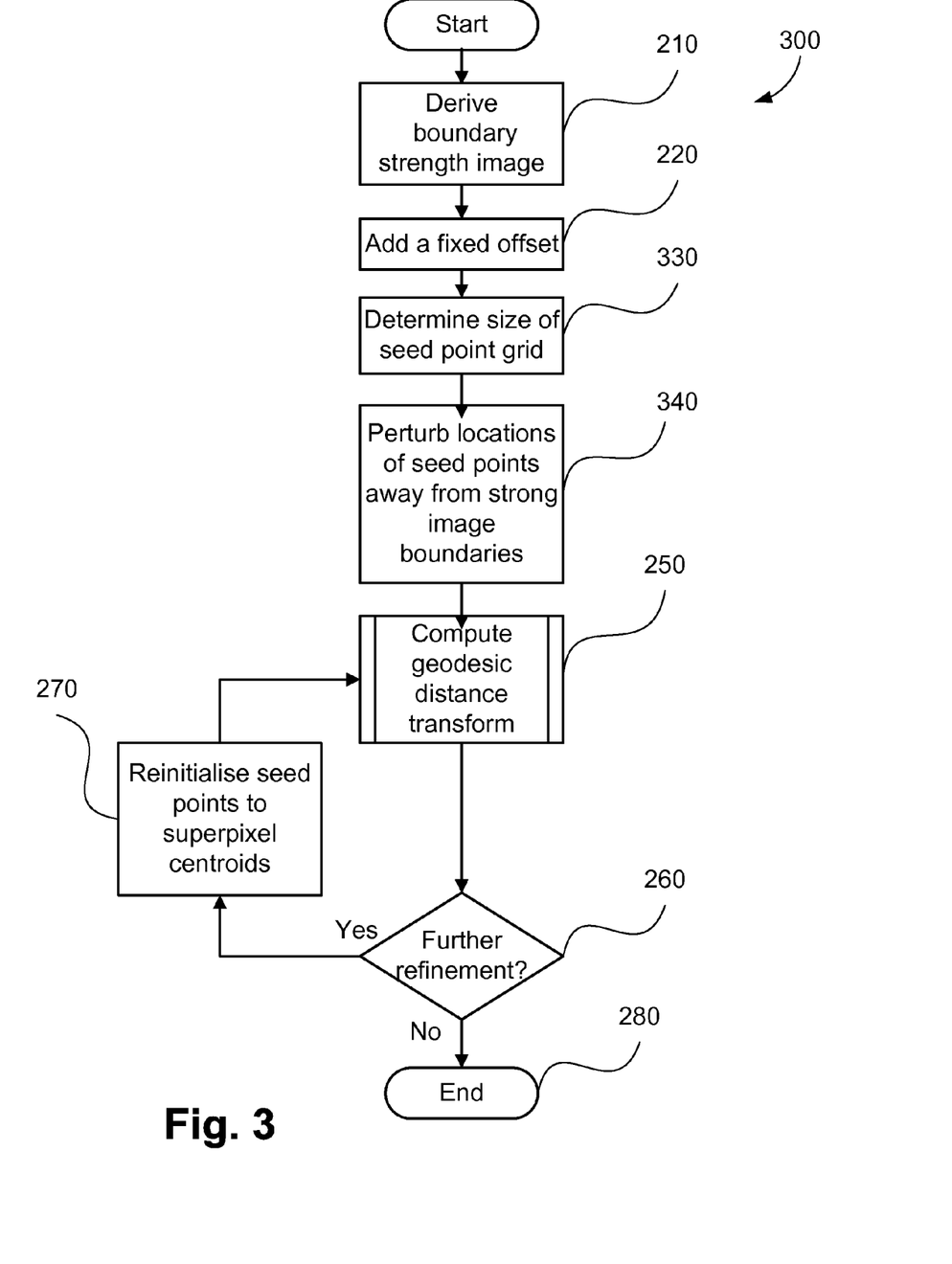
FIG. 3 is a flow diagram of an alternative process for segmenting an image into a plurality of image segments in accordance with another embodiment of the present invention.

Each step or sub-process in the processes of FIGS. 2-4 is associated with one or more segments of the program 133 and is performed by the register section 144, 145, 146, the ALU 140, and the control unit 139 in the processor 105 working together to perform the fetch, decode, and execute cycles for every instruction in the instruction set for the noted segments of the program 133.

FIG. 2 is a flow diagram of a segmentation method or process 200 that produces regular superpixels from an input image given a pre-defined number of desirable output segments. The segmentation process 200 may be performed by one or more processors such as the processor 105 of the computer system 100 of FIG. 1.

In one arrangement, the pre-defined number of output segments is specified by the user of the system, e.g., 100 superpixels per image. In another arrangement, the pre-defined number of output segments is computed based on the number of pixels in the input image. For example, in one implementation, the number of superpixels was set to equal to the square root of the number of pixels in the image, rounded to the nearest integer.

Referring to FIG. 2, a boundary strength image is derived or computed from the input image in step 210. The input image may, for example, be acquired from a camera or scanner such as the camera 127 or scanner 126 of FIG. 1. Alternatively, the input image may be retrieved from a storage medium such as the storage devices 109, the HDD 110, the optical disk drive 112, the disk storage medium 125, or from another storage medium accessible via the wide-area communications network 120 or the local-area communications network 122 of FIG. 1.

In one implementation, the derived image is an image of local gradient energy of the input image. The gradient energy image is the sum of the gradient energy in two perpendicular directions such as the x- and y-directions. The gradients along the x- and y-directions may, for example, be computed using Gaussian derivative filters applied to the input image. These directional Gaussian derivative filters usually have the same scale $\sigma$, such as $\sigma=1$ pixel. In one arrangement in which the input image comprises a multi-channel image such a Red-Green-Blue (RGB) image from a consumer digital camera, the gradient energy image is computed as the sum of the gradient energy images from all channels. In another arrangement, a multi-channel input image is converted to a perceptually linear colour space such as the CIE L*-a*-b* colour space before gradient energy computation to enhance the differences amongst different colours. In yet another arrangement, the derived image comprises the local gradient energy raised to a power $\alpha$, where $\alpha>0.5$. In another arrangement, the derived image is a geometric mean of gradient energy images computed over multiple scales, such as $\sigma_n=2n$ pixels, where $n=0, 1, 2, 3, \ldots$.

A fixed or constant offset (e.g., a scalar offset) is added to the derived image in optional step 220. The value of the constant offset typically depends on the dynamic range of the derived image. In one implementation, the constant offset is set to the greater of the median intensity of the derived image, and the dynamic range of the derived image times 0.0001. The purpose of this constant offset addition step will be made clearer in the description of step 250, hereinafter. The addition of a fixed offset to the derived image, while optional, is desirable as it results in a more regularised segmentation of the input image.

At step 230, a random noise offset, also known as random noise pattern, is added to at least a portion of the derived image. The image portion to which the random noise pattern is added may, for example, be a region of constant local intensity in the derived image. The purpose of this noise addition step will be made clearer in the description of step 240, hereinafter. The magnitude of the added noise is typically small, such as to incur imperceptible change to the derived image. In one implementation, Gaussian random noise with zero mean and standard deviation of 0.0001 times the dynamic range of the derived image is used. The random noise can be generated with a pre-determined random seed. In one arrangement, if multiple frames of a video captured by a static camera are segmented sequentially, the same random seed is used to produce coherent noise across multiple frames. In another arrangement, if the video is captured by a moving camera, a shifted version of the same noise pattern is added to each frame to maintain the temporal coherence of noise at pixels corresponding to the same physical location in the scene. In yet another arrangement, the random noise pattern is shifted or warped according to the motion of the scene content before being added to the derived image. The resulting image after noise and offset addition is called a boundary cost image.

Local minima of the boundary cost image are detected at step 240, where a local minimum is a point with a lowest measure of boundary strength within its own neighbourhood (a point may correspond to a pixel or a sub-pixel location). The detected local minima are used as seeds for performing superpixel segmentation in step 250, hereinafter. The noise addition in step 230 advantageously ensures an even distribution of detected local minima everywhere in the boundary cost image, including in flat regions in the derived image. In one implementation, the neighbourhood comprises pixels in a square window of size (2r+1)-by-(2r+1) around the neighbourhood centre. The neighbourhood radius r relates to a desired average area of the output superpixels. This average superpixel area is equal to the ratio between the total number of pixels in the input image and the desired number of output superpixels. Such local minima over a fixed size neighbourhood can be located using a non-maximal suppression technique. Non-maximal suppression detects local maxima over a rectangular neighbourhood. To find local minima, non-maximal suppression is applied to a negated boundary cost image. Non-maximal suppression guarantees a minimum separation distance between the selected minima. However, non-maximal suppression does not produce an exact number of desired local minima. In another implementation, an exact number of desired local minima is found from the boundary cost image using adaptive non-maximal suppression. Adaptive non-maximal suppression selects an oversupply of initial local maxima using non-maximal suppression with a small neighbourhood window. A suppression radius is then computed for each local maximum, where the suppression radius refers to the radius of a largest square neighbourhood whose pixels are all smaller than the local maximum. A desired number of local maxima with the highest suppression radii are then selected from the list of initial local maxima.

At step 250, a geodesic distance transform is computed on a geodesic space defined by the boundary cost image given the local minimum seeds generated in step 240. A geodesic distance between two points is defined as the total cost along a geodesic path between these two points, where a geodesic path is the path of minimum integrated cost along the path. If the cost image is constant and positive, the geodesic path between any two points is a straight line. In the target application, the boundary cost image is usually not flat since there are visual structures in the input image. The geodesic path between two points on a non-flat cost image is therefore not a straight path. The geodesic distance transform of a cost image is the total cost along a minimum cost path from each pixel to its nearest seed in the geodesic space. A by-product of the geodesic distance transform is a nearest seed transform, which associates each pixel in the image with its nearest seed in the geodesic space. That is, the nearest seed transform partitions the set of all pixels in the cost image into groups of connected pixels, with each group sharing a common seed point. The pixels associated with a seed point form a connected segment, which forms a superpixel. Hence, the nearest seed transform is superpixel segmentation from the given seeds.

The reason for optionally adding a fixed offset to the derived image in step 220 is now explained within the framework of geodesic distance transform in step 250. If the cost image is constant and positive, the geodesic path between any two points is a straight line, which is the shortest path in the Euclidean space. The geodesic distance transform on a flat space is therefore equivalent to the Euclidean distance transform. The nearest seed transform then produces a polygon tessellation of the 2-D image space which is also known as a Voronoi tessellation. The polygon segments of a Voronoi tessellation are called Voronoi cells. Given the same set of seeds, Voronoi tessellation produces the most regular sized and shaped segments that completely cover the 2-D image space. In the present case, the boundary cost image is usually not flat since there are visual structures in the input image. As a result, the geodesic paths between any two points are usually not straight. The noisier the boundary cost image is, the jaggier or less straight the geodesic paths become. Irregular geodesic paths produce an irregular nearest seed transform, and therefore irregular superpixel segmentation. To make geodesic superpixels become more regular as the Voronoi cells, the boundary cost image is altered such that geodesic paths become straighter. A constant positive offset added to the boundary cost image achieves this purpose because the total cost over any path is now increased by the length of the path times the constant offset. Jaggier paths will therefore have a larger total cost than straighter paths. Straighter paths are then more likely to be minimum cost paths, which improves the regularity of the tessellation.

There are numerous possible methods for computing a geodesic distance transform given a cost image and a set of seed points. A naïve method is to compute the pair-wise geodesic distance between every pixel and every seed point. For any given pixel, the seed point with the smallest geodesic distance is selected as the nearest seed in the geodesic space and this smallest geodesic distance is the geodesic distance transform at the given pixel. However, this naïve method is computationally intensive due to the many pair-wise geodesic distances that are required to be computed, each of which is costly to compute.

In one implementation, a chamfer algorithm is used to compute an approximation of the geodesic distance transform. This approximation discretises the path between two pixels. A discretised path starting from a given pixel can only move along eight possible directions corresponding to the eight immediate neighbours of the given pixel within a 3×3 neighbourhood. The total cost along a geodesic path connecting the two points is therefore a weighted sum of the cost values of the pixels along the path. The chamfer weight is roughly equal to the Euclidean distance between two connected neighbouring pixels (1 for 4-connected neighbours along the north, south, east, west directions, and $\sqrt{2} \approx 1.4142$ for diagonal neighbours along the north-east, north-west, south-east, south-west directions). A chamfer distance transform requires only a few forward and backward passes over the cost image, where the forward pass scans the image from top to bottom and left to right, and the backward pass scans the image from bottom up and right to left. In the case of a geodesic distance transform over a boundary cost image, a forward pass followed by a backward pass followed by another pair of forward and backward passes are usually enough to produce non-fragmented segmentation from the nearest seed transform (a fragmented segment is a disjoined group of pixels sharing the same nearest seed).

At step 260, a determination is made whether or not to perform superpixel refinement by seed re-centroiding followed by another iteration of performing a geodesic distance transform. After step 250, the superpixels produced are already regular due to the placement of seeds at local minima of the derived image and the constant offset added to the derived image as explained previously in steps 240 and 250, respectively. However, depending on the required implementation, more regular superpixels may be desirable. One characteristic of a regular-shaped superpixel is the centroid of the superpixel coinciding with the seed point of the superpixel, where the centroid of a segment is located at the average coordinates of all pixels within the segment. By iteratively re-positioning the seeds to the centroids of previously computed superpixels (rounded to the nearest pixels) and re-growing the superpixels using a geodesic distance transform, the superpixel segmentation can become even more regular.

If the determination at step 260 is to perform further re-centroidal refinement, control is passed to step 270. Otherwise, the process 200 ends at step 280.

The determination to continue performing superpixel re-centroidal refinement can come from the user in a form of a pre-defined number of iterations, say 4. The number of iterations is reduced by one every time step 270 is executed. Eventually when the number of iterations reduces to zero, the determination made at step 260 will be to exit the loop and end the process 200 at step 280.

In another arrangement, the decision to perform further superpixel re-centroidal refinement is determined automatically by the algorithm after a convergence test. If after seed re-centroiding, the locations of the new seeds do not differ from the locations of the old seeds (or do not differ by more than a threshold amount), the iterative seed re-centroiding process is said to have converged. Once the seed re-centroiding process has converged, the superpixels attain their maximally possible regularity by this method. The determination at step 260 is then to exit the loop and end the process 200 at step 280.

At step 270, the seed points of previously computed superpixels are reinitialised to the corresponding superpixels' centroids, as described with reference to step 260, hereinbefore. Alternatively, the seed points of previously computed superpixels are reinitialised to the corresponding superpixels' weighted centroids. The weight for each pixel is the geodesic distance previously computed at that pixel.

At step 280, the superpixel generation process 200 terminates.

In certain implementations, in which further refinement is not required, the loop comprising steps 260 and 270 is unnecessary and these steps are thus not performed. In other words, the method or process can end after performing step 250.

The local minima of the boundary cost image as detected at step 240 can be used as seed points to segmentation techniques other than geodesic segmentation. For example, local gradient minima can be used as the initial cluster centres for the prior art segmentation method that performs clustering the local pixels in a 5-D Labxy space. Local gradient minima can also be used in prior art segmentation methods that use curve evolution.

FIG. 3 is a flow diagram of another segmentation method or process 300 that produces an approximate number of desirable superpixels from an input image. The process 300 uses a different seed initialisation method from the process 200 of FIG. 2. While the process 200 uses local minima of the boundary cost image as seeds, the process 300 uses a perturbed point grid as seeds. Due to the different seed initialisation, the process 300 produces less regular superpixels than the process 200 but has an advantage of easier indexing of the gridded superpixels. Apart from the new seed initialisation steps 330 and 340, all other steps of the process 300 are the same as the correspondingly numbered steps in the process 200 of FIG. 2. As a result, only steps 330 and 340 are described hereinafter.

Step 330 computes the size of a rectangular 2-D seed point grid that will grow to an approximate number of desirable output superpixels N. Assuming the size of the input image is W×H, where W and H are the size of the image's width and height respectively, an average width and height of the output superpixels is $\sqrt{W \times H/N}$. The rectangular point grid should then have round ($H/\sqrt{W \times H/N}$) rows and round ($W/\sqrt{W \times H/N}$) columns to ensure similar horizontal and vertical grid spacing, where round( ) is an operator that rounds a number to the nearest integer. Due to the rounding operation, the number of points from the grid will not be exactly the desired number of segments N. The process 300 therefore only produces an approximate number of desired superpixels.

Step 340 perturbs the location of the gridded seed points away from strong image boundaries identified in step 210. This seed perturbation is necessary because seed points located right on top of a strong boundary tend to produce tiny superpixels, whose sizes are in proportion to the full-width half-maximum of the cross-section of the boundary edge. The perturbed location of a grid point can be the location of the pixel with minimum boundary measure within a local neighbourhood of the grid point. In one implementation, the local neighbourhood is a 5×5 pixel window around the grid point.

The chamfer algorithm to compute a geodesic distance transform from a non-negative boundary cost image f(x,y) and a set of seed points in step 250 of FIGS. 2 and 3 is now described in further detail with reference to FIGS. 4a-4d (x,402 and y,403 are the Cartesian coordinates of the sampled boundary cost image). The chamfer algorithm computes an approximation of the geodesic distance transform by approximating any path between two pixels by a discretised path between them. A discretised path comprises line segments connecting a pixel with one of its eight neighbouring pixels within a 3×3 neighbourhood. A minimum cost path from a pixel to its nearest seed, which is also located at a pixel, therefore goes through a series of pixels along the discretised path. All pixels along this discretised minimum cost path share a common nearest seed. As a result, the nearest seed of a pixel is most of the time also the nearest seed of a neighbouring pixel (except when the nearest seed to the pixel is located at the pixel itself). Using this property of common nearest seed amongst neighbouring pixels, the chamfer algorithm attempts to propagate the nearest seed and the geodesic distance from one pixel to its immediate neighbours within a 3×3 neighbourhood.

Figure 4A:
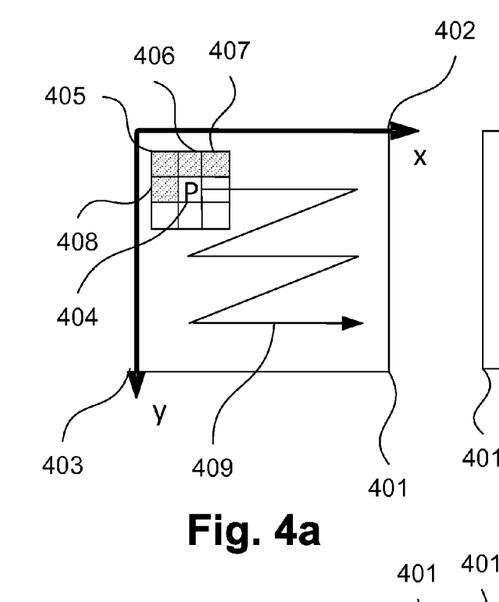
FIGS. 4a to 4d illustrate operation of a chamfer algorithm to compute a geodesic distance transform.
Figure 4B:
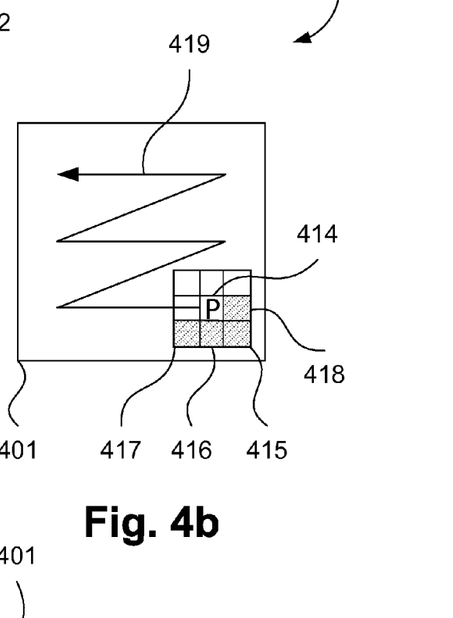
Figures 4C, 4D:
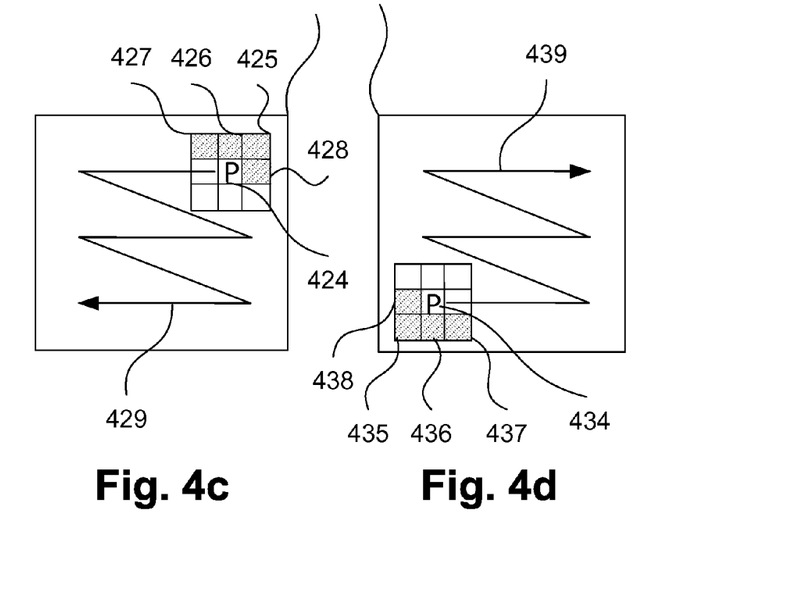

The chamfer algorithm initially assigns a very large distance (such as infinity) to every pixel in the geodesic distance transform image 401, except at seed points where the distance is zero. The distance transform image 401 is then updated by several scans of itself and the boundary cost image. Each scan propagates the distance from four causal neighbours to a current pixel P. The direction of the scans alternate between two directions: from top to bottom, left to right 401 as illustrated in FIG. 4a and from bottom to top, right to left 419 as illustrated in FIG. 4b. Additional scan directions such as from top to bottom, right to left 429 as illustrated in FIG. 4c and from bottom to top, left to right 439 as illustrated in FIG. 4d can also be used. During each scan, for example the top-down, left-right scan 409 illustrated in FIG. 4a, the distance transform d($x_1$,$y_1$) of a current pixel 404 is updated using the distance transform of its four causal neighbours 405 at location ($x_1$−1,$y_1$−1), 406 at location ($x_1$,$y_1$−1), 407 at location ($x_1$+1,$y_1$−1), 408 at location ($x_1$−1,$y_1$+1) by the following distance propagation equation:

$$d(x_1, y_1) = \min \begin{pmatrix} d(x_1 - 1, y_1 - 1) + b \cdot f(x_1, y_1), \\ d(x_1, y_1 - 1) + a \cdot f(x_1, y_1), \\ d(x_1 + 1, y_1 - 1) + b \cdot f(x_1, y_1), \\ d(x_1 - 1, y_1) + a \cdot f(x_1, y_1) \end{pmatrix}$$

where: a=0.9619 and b=1.3604 are optimal chamfer coefficients for the 4-connected neighbours 406, 408 and the diagonal neighbours 405, 407, respectively; f($x_1$,$y_1$) is the boundary cost at the current pixel ($x_1$,$y_1$); and the 'min' operator selects the minimum distance amongst the four distances propagated from the four causal neighbours.

The causal neighbour from which the current pixel 404 gets its minimum geodesic distance from also passes on its nearest seed to the current pixel. Out of bound neighbouring pixels (neighbouring pixels whose coordinates are outside the coverage area of the input image) are ignored in the distance propagation equation.

After a forward pass 409 is performed over the whole distance transform image 401, a backward pass 419 is then applied to the updated distance transform image. In FIG. 4b, the distance transform d($x_1$,$y_1$) of a current pixel 414 is updated using the distance transform of its four causal neighbours 415 at location ($x_1$+1,$y_1$+1), 416 at location ($x_1$,$y_1$+1), 417 at location ($x_1$−1,$y_1$+1), 418 at location ($x_1$+1,$y_1$) in a similar fashion to the forward pass 409:

$$d(x_1, y_1) = \min \begin{pmatrix} d(x_1 + 1, y_1 + 1) + b \cdot f(x_1, y_1), \\ d(x_1, y_1 + 1) + a \cdot f(x_1, y_1), \\ d(x_1 - 1, y_1 + 1) + b \cdot f(x_1, y_1), \\ d(x_1 + 1, y_1) + a \cdot f(x_1, y_1) \end{pmatrix}$$

Similarly, in FIG. 4c, a top-down, right to left scan 429 propagates the distance transform from four causal neighbours 425 at location ($x_1$+1,$y_1$−1), 426 at location ($x_1$,$y_1$−1), 427 at location ($x_1$−1,$y_1$−1), 428 at location ($x_1$+1,$y_1$) to the current pixel 424 at location ($x_1$,$y_1$):

$$d(x_1, y_1) = \min \begin{pmatrix} d(x_1 + 1, y_1 - 1) + b \cdot f(x_1, y_1), \\ d(x_1, y_1 - 1) + a \cdot f(x_1, y_1), \\ d(x_1 - 1, y_1 - 1) + b \cdot f(x_1, y_1), \\ d(x_1 + 1, y_1) + a \cdot f(x_1, y_1) \end{pmatrix}$$

In FIG. 4d, a bottom-up, left to right scan 439 propagates the distance transform from four causal neighbours 435 at location ($x_1$−1,$y_1$+1), 436 at location ($x_1$,$y_1$+1), 437 at location ($x_1$+1,$y_1$+1), 438 at location ($x_1$−1,$y_1$) to the current pixel 434 at location ($x_1$,$y_1$):

$$d(x_1, y_1) = \min \begin{pmatrix} d(x_1 - 1, y_1 + 1) + b \cdot f(x_1, y_1), \\ d(x_1, y_1 + 1) + a \cdot f(x_1, y_1), \\ d(x_1 + 1, y_1 + 1) + b \cdot f(x_1, y_1), \\ d(x_1 - 1, y_1) + a \cdot f(x_1, y_1) \end{pmatrix}$$

The chamfer geodesic distance transform algorithm requires only a few passes over the boundary cost image. In one implementation, a forward pass 409 followed by a backward pass 419 followed by another pair of the 429 and 439 passes are usually enough to produce a non-fragmented nearest seed transform.

Figure 5A:
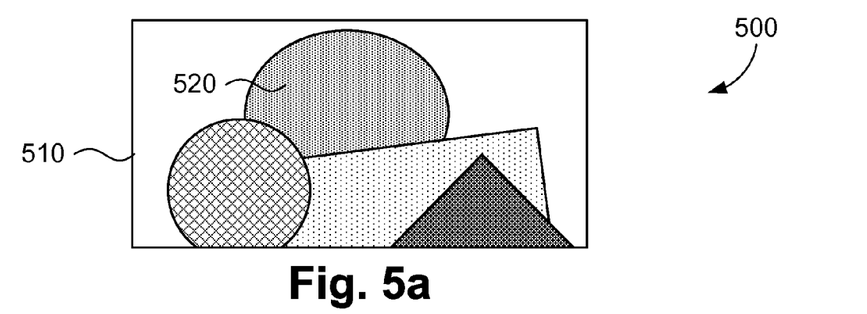
FIGS. 5a to 5d illustrate an example of superpixel segmentation in accordance with an embodiment of the present invention.
Figure 5B:
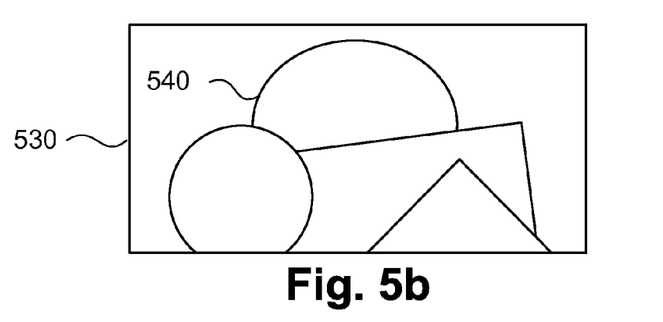
Figure 5C:
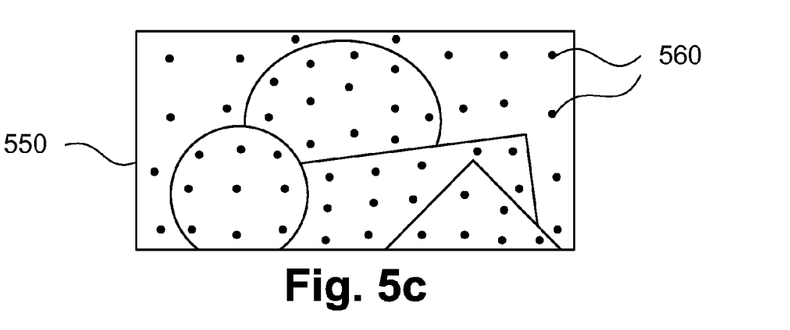
Figure 5D:
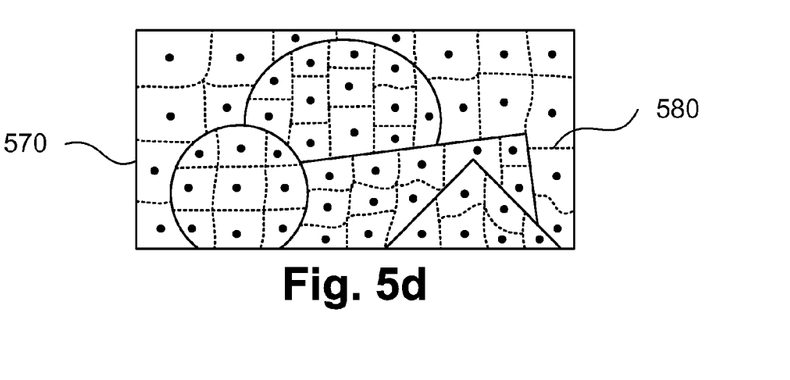

The original chamfer algorithm for computing geodesic distance transforms as described with reference to FIGS. 4a-4d is not hardware efficient. For example, the algorithm requires buffering of the whole distance transform image and the whole boundary cost image in memory for multiple passes from top down and then bottom up. To make the chamfer algorithm more hardware efficient, the original chamfer algorithm may be performed on a thin band of the image at a time, where an image band comprises a group of consecutive image scan lines, and each scan line comprises a group of pixels along a row or column of the image. The choice of row or column depends on the raster scan order of the imaging system. The distance transform of the whole image is then calculated by propagating the already computed distance transform of a first image band to a second image band, which has a small overlap with the first band. Each time an image band is processed, the whole band is buffered in memory for easy forward and backward scans within the band. This band-based image processing approach requires minimal on-chip memory while still maintaining a similar rate of pixel throughput. In one particular implementation, the number of image scan-lines within each image band is twice the size of the expected superpixel width or height. The number of overlapping scan-lines between consecutive bands is equal to half the number of image scan-lines within each band. This is to ensure a smooth segmentation boundary for superpixels lying across consecutive bands. An example of geodesic superpixel segmentation 500 produced by the process 200 of FIG. 2 is now illustrated with reference to FIGS. 5*a*-5*d*. FIG. 5*a* shows an input image 510 of a simple scene featuring different objects, as indicated by 520. FIG. 5*b* shows a boundary strength image 530 derived in step 210 from the input image 510. For example, a boundary 540 exists between a grey-colour object 520 and the white background. FIG. 5*c* shows a boundary cost image 550 computed from the derived image 530 by noise and offset addition in steps 230 and 220, respectively. A number of local minima 560 are detected in step 240 at different parts of the boundary cost image 550 by a non-maximal suppression method. These local minima are well-distributed over the whole image. The local minima are also positioned well away from image edges 540, which have high boundary responses. A geodesic distance transform is computed in step 250 on the boundary cost image 550 and the local minima seeds 560. A nearest seed transform 570 derived from the geodesic distance transform is illustrated in FIG. 5*d*, where an image segment is formed around each seed. The segment boundaries 580 shown in dotted lines sometimes coincide with scene boundaries 540. The nearest seed transform 570 in FIG. 5*d* is a superpixel segmentation of the input image 510 in FIG. 5*a*.

Figure 6:
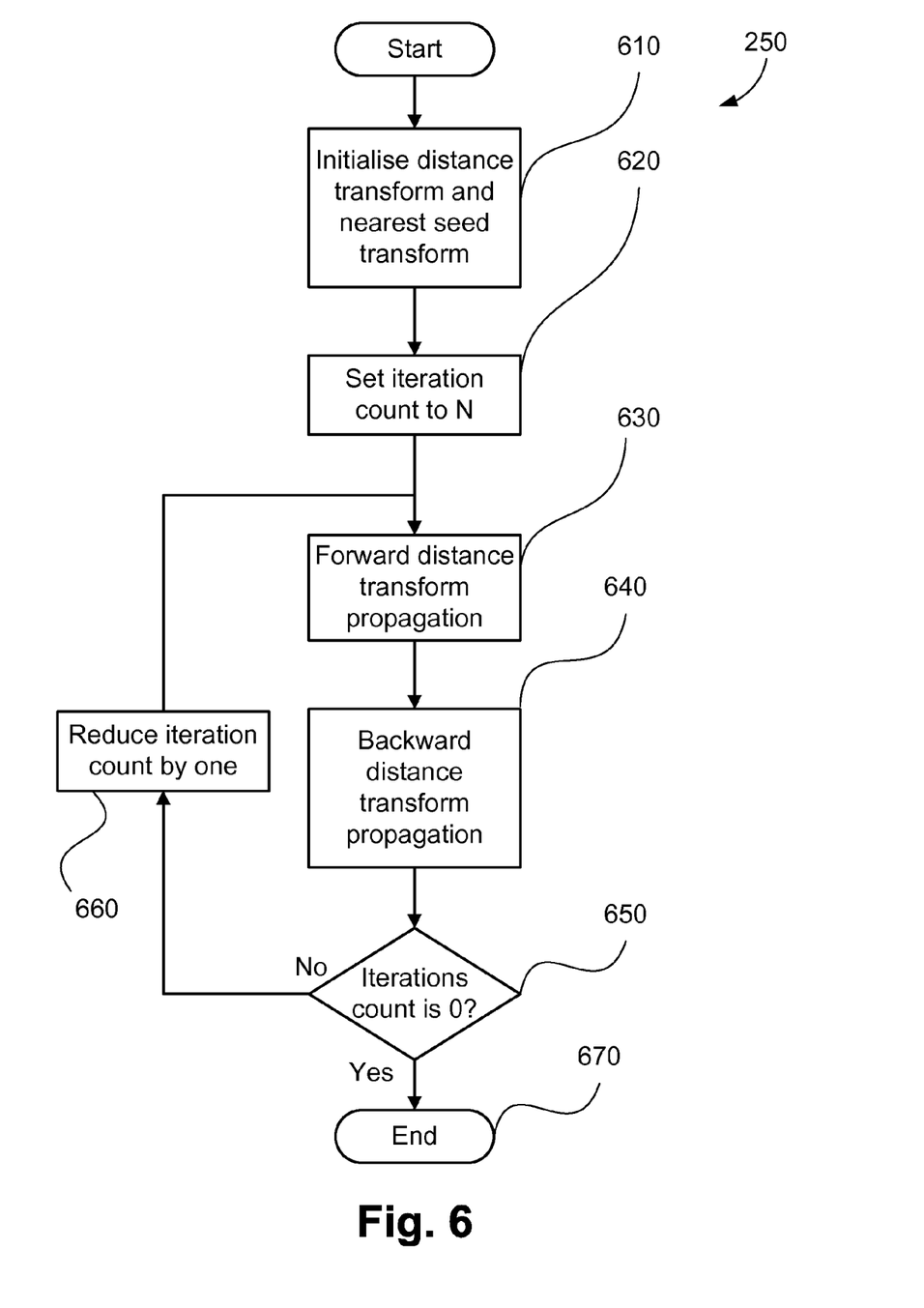
FIG. 6 is flow diagram of an iterative chamfer algorithm to compute a geodesic distance transform.

The geodesic distance transform step 250 is now described in further detail with reference to FIG. 6. This chamfer algorithm accepts a non-negative boundary cost image $j(x,y)$ and a set of seed points as inputs. The chamfer algorithm outputs two images: a geodesic distance transform image and a nearest seed transform image. The sizes of output images are equal to the size of the input boundary cost image. Referring to FIG. 6, step 610 initialises the geodesic distance transform at every pixel to a very large distance (such as infinity), except at seed points where the distance is zero. Step 610 also initialises the nearest seed transform at each seed point location to the label of the seed point itself. The chamfer algorithm then enters an iterative update loop, starting with step 620 where an iteration count is set to a positive integer N (e.g. N=10). Inside the loop, step 630 propagates the geodesic distance transform and the nearest seed transform in a forward direction as described in FIG. 4*a*, and step 640 propagates the these transforms in a backward direction as described in FIG. 4*b*. Control is then passed to step 650, where the iteration count is compared against zero. If the iteration count is still above zero, it is reduced by one in step 660, and the algorithm loops back to step 630. Otherwise, if the iteration count is zero, the loop exits at step 670.

To speed up the iterative chamfer algorithm, each of the forward and backward propagation steps 630 and 640 can be implemented on parallel hardware. For example, the chamfer distance propagation can be implemented on parallel hardware with shared memory such as a multicore Central Processing Unit (CPU). The transform images can be stored in the shared memory, to which all processing cores have read access. Each processing core only writes to part of the image at a time, avoiding the risk of data corruption and the need to synchronise data between different processing cores. The chamfer distance propagation can also be implemented on parallel hardware with distributed memory such as a cluster of networked computers. This requires the image data to be synchronised after each iteration so that the updated image data is available to all processors at the next iteration.

To perform parallel image processing, the image data must be partitioned and distributed to individual processors. One strategy to partition an image is a band-based partitioning strategy, in which the image is partitioned into a disjoint set of image rows. Because the Geodesic Distance Transform (GDT) typically requires more than one iteration of forward+ backward passes, the updated geodesic distance and nearest seed information can be propagated from one image band to the next in a subsequent iteration rather than within a current pass. A band-based image partitioning across different processors (or threads in the case of a multicore CPU) is well supported by many parallelisation application programming interfaces such as OpenMP.

Figure 7:
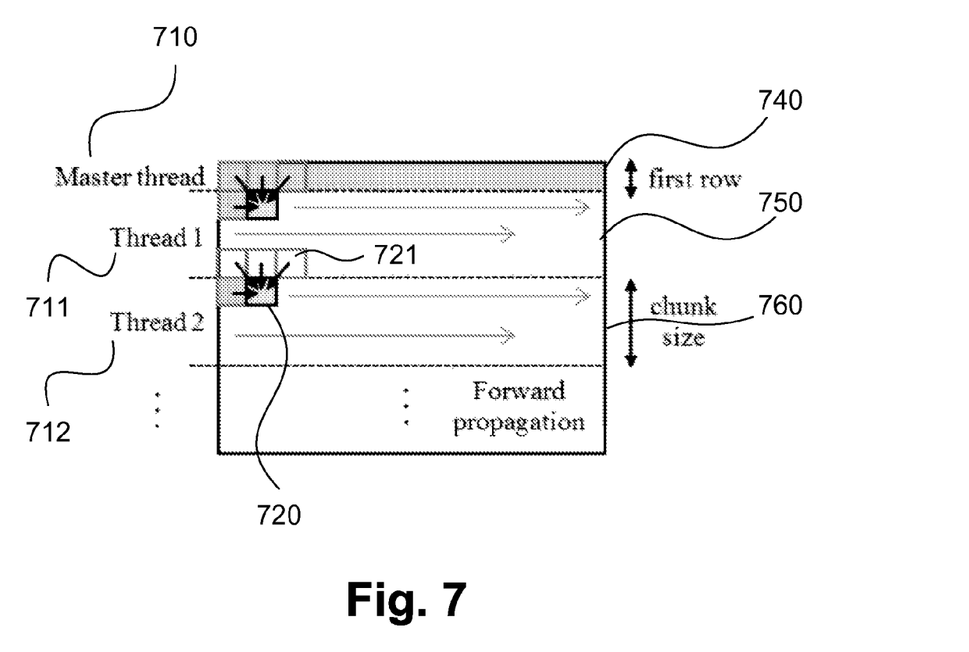
FIG. 7 illustrates a strategy to partition an image into a disjoint set of image bands for parallel forward distance propagation.

FIG. 7 illustrates a band-based image partitioning strategy for a forward propagation of the GDT. The forward GDT processes each image band 750-760 in a scan-line fashion, starting from the top-left pixel of the band and ending at the bottom-left pixel of the band. At each current pixel 720, the geodesic distance and information about the nearest seed is derived from information of the four causal neighbours 721 above and to the left of the current pixel. The first image row 740 is processed by a master thread 710 outside any parallel processing block. The first row is treated differently from the remaining rows in the image because pixels on the first row have only one causal neighbour. The remaining image rows are partitioned into non-overlapping bands of equal height (called chunk size in OpenMP terminology). Each band is processed concurrently by a different thread, e.g. the first band 750 is processed by the first thread 711, and the second band 760 is processed by the second thread 712. If there are more bands than the total number of threads, the unprocessed bands are assigned to available threads in a round-robin fashion (i.e., static scheduling) or to the next available thread (i.e., dynamic scheduling).

One important requirement in parallel programming is that the parallel region must be thread-safe. In order words, each iteration of the forward GDT 630 loop should be able to be executed independently without interaction across different threads (e.g., no data dependencies across different threads). In GDT, this means that the distance propagation within one band should not wait for the result of the previous band. Thread 2 in FIG. 7, for example, should not wait until Thread 1 finishes the computation of the last row of the first band 750. This means the GDT of the first band is not propagated to the second band 760 within the current iteration, but rather in the next iteration.

Because the computed distances from one thread are not used by other threads within the current iteration, it may take longer for the GDT to propagate from the top band to the bottom band and vice versa. However, given a dense sampling of seed points, each seed point only has a limited spatial range of influence. In other words, the distance transform at one pixel is never propagated for more than a few bands away. The range of influence depends on local seed density and chunk size. As a result, a few iterations of forward+backward propagation (fewer than 30) are sufficient for most cases.

Figure 8:
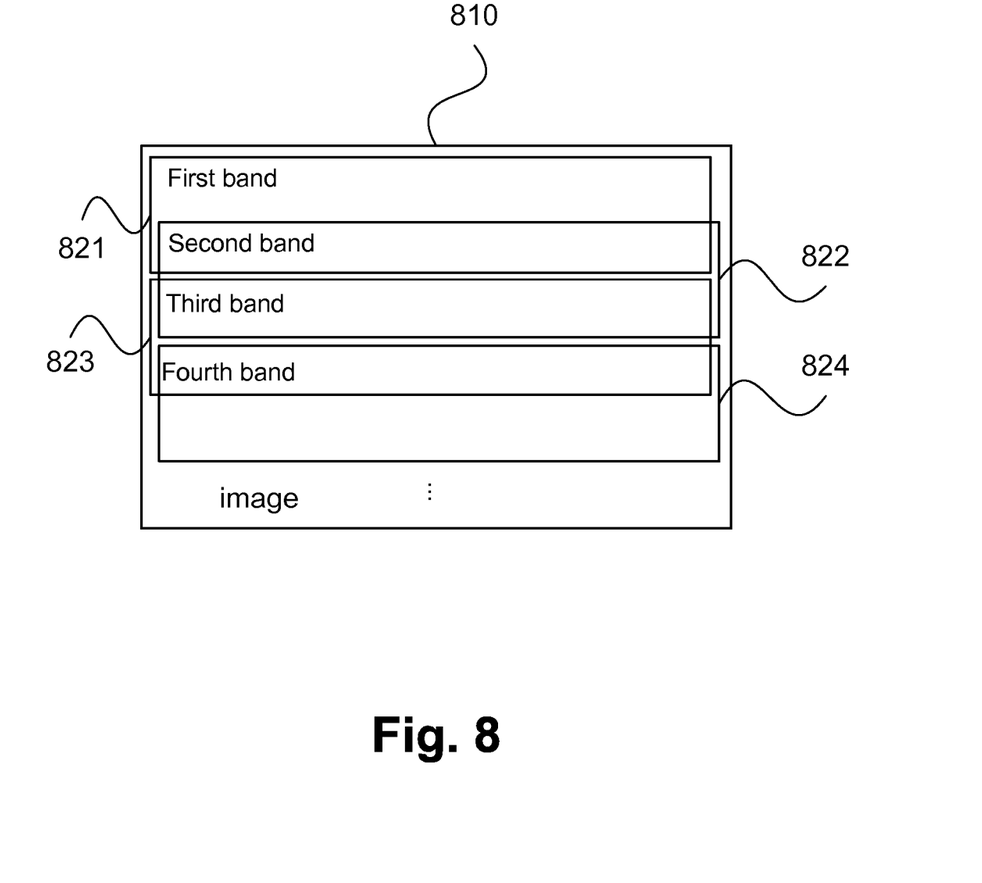
FIG. 8 illustrates a strategy to partition an image into overlapping set of image bands for sequential processing in a hardware environment with limited memory buffer.

If the seed points are densely sampled as in the case of local gradient minima, the geodesic segmentation can be implemented using a hardware-friendly overlapping band-based architecture that does not require buffering the whole image in memory. An illustration of this overlapping band image processing strategy is shown in FIG. 8. The image 810 is partitioned into overlapping bands 821, 822, 823, 824. GDT is computed for all bands sequentially, starting from the top band and progressing downwards. Within each band, multiple forward and backward distance propagation iterations (e.g., 10 iterations) are performed similar to the chamfer GDT algorithm on the full image. Once processed by the chamfer GDT algorithm, a band will not be processed again so it can be safely removed from the hardware buffer. A band should overlap with its upper and lower bands to allow sufficient propagation of information from seeds outside the current band. For example, the height of the band equals 2-times the maximum height of a superpixel, and the overlap equals the maximum superpixel height. The maximum height of a superpixel can be estimated from the average height of a superpixel, which in turn can be estimated from the size of the image and the number of superpixel seeds. This band overlap ensures the same superpixels are produced under the band-based approach compared to the traditional full image approach, even if the superpixels span multiple bands.

INDUSTRIAL APPLICABILITY

The arrangements described hereinbefore are applicable to the computer and data processing industries and particularly for processing images.

The foregoing describes only some embodiments of the present invention, and modifications and/or changes can be made thereto without departing from the scope and spirit of the invention, the embodiments being illustrative and not restrictive.

I claim:

1. A method of segmenting an input image into a plurality of segments, said method comprising the steps of:
    deriving an image representative of boundary strength of each of a plurality of pixels in the input image;
    adding a random noise pattern to at least a portion of said derived image;
    determining a plurality of local minima in the derived image with the random noise pattern added, each of the plurality of local minima comprising a point with a lowest measure of boundary strength within a pre-defined region in the derived image; and
    associating each of the plurality of pixels in the input image with one of the determined local minima to segment the image based on a geodesic distance transform of the measure between the determined local minima and the pixels.

2. A method according to claim 1, comprising the further step of adding a constant offset to the derived image.

3. A method according to claim 1, wherein the random noise pattern is warped according to motion between the input image and the derived image before being added to the derived image a first input image and a second input image before being added to a second derived image.

4. A method according to claim 1, wherein the local minima is computed using one of:
    (a) non-maximal suppression; and
    (b) adaptive non-maximal suppression.

5. A method according to claim 1, wherein the geodesic distance transform is computed using one of:
    (a) a chamfer algorithm; and
    (b) a band-based chamfer algorithm.

6. A method according to claim 1, wherein the derived image comprises an image of local gradient energy of the input image, and wherein the gradient energy of the input image is a linear combination of the gradient energy of each channel of the input image.

7. A method according to claim 6, wherein the input image is converted to the CIE L*-a*-b* colour space before computing the gradient energy of each channel.

8. A computer system for segmenting an input image into a plurality of segments, said computer system comprising:
    a memory unit for storing data and instructions; and
    a processor unit coupled to said memory unit, said processor unit programmed to:
        compute an image representative of boundary strength of each of a plurality of pixels in the input image;
        add a random noise pattern to at least a portion of said derived image;
        determine a plurality of local minima in the derived image with the random noise pattern added, each of the plurality of local minima comprising a point with a lowest measure of boundary strength within a pre-defined region in the derived image; and
        associate each of the plurality of pixels in the input image with one of the determined local minima to segment the image based on a geodesic distance transform of the measure between the determined local minima and the pixels.

* * * * *